Feb. 11, 1936.   R. N. MILLER   2,030,650
TROLLEY PATROL CAR
Filed Nov. 6, 1931   12 Sheets-Sheet 2
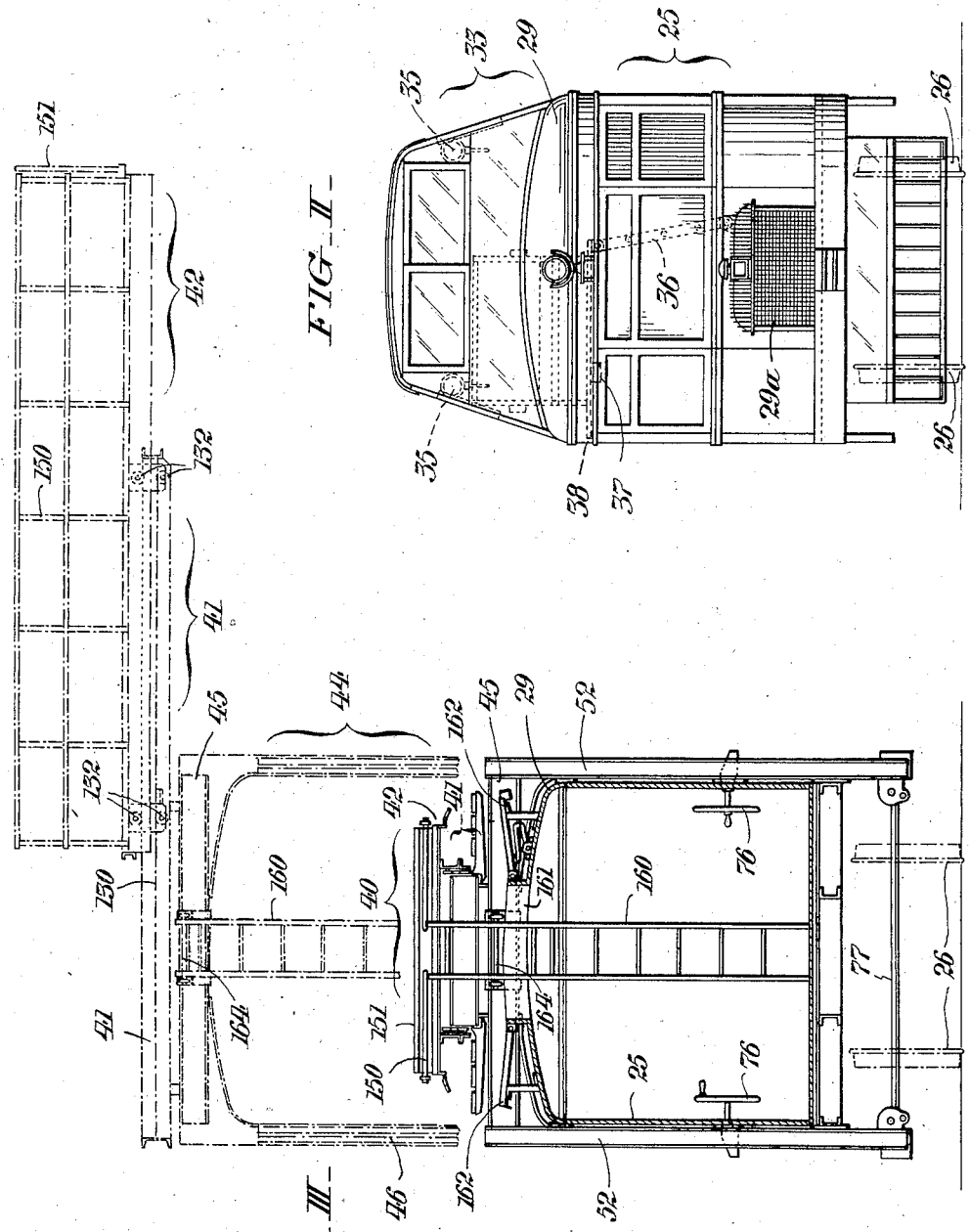

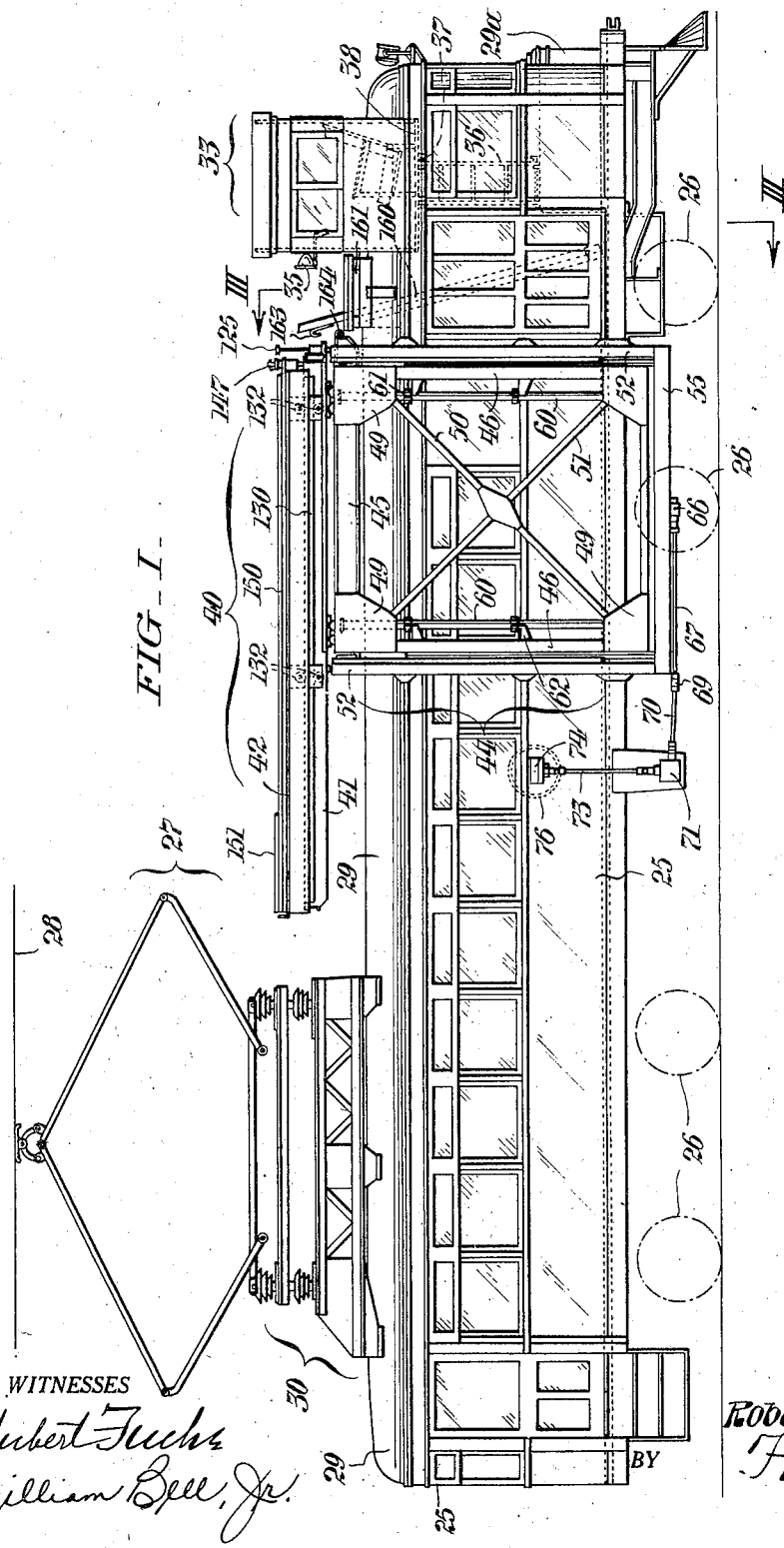

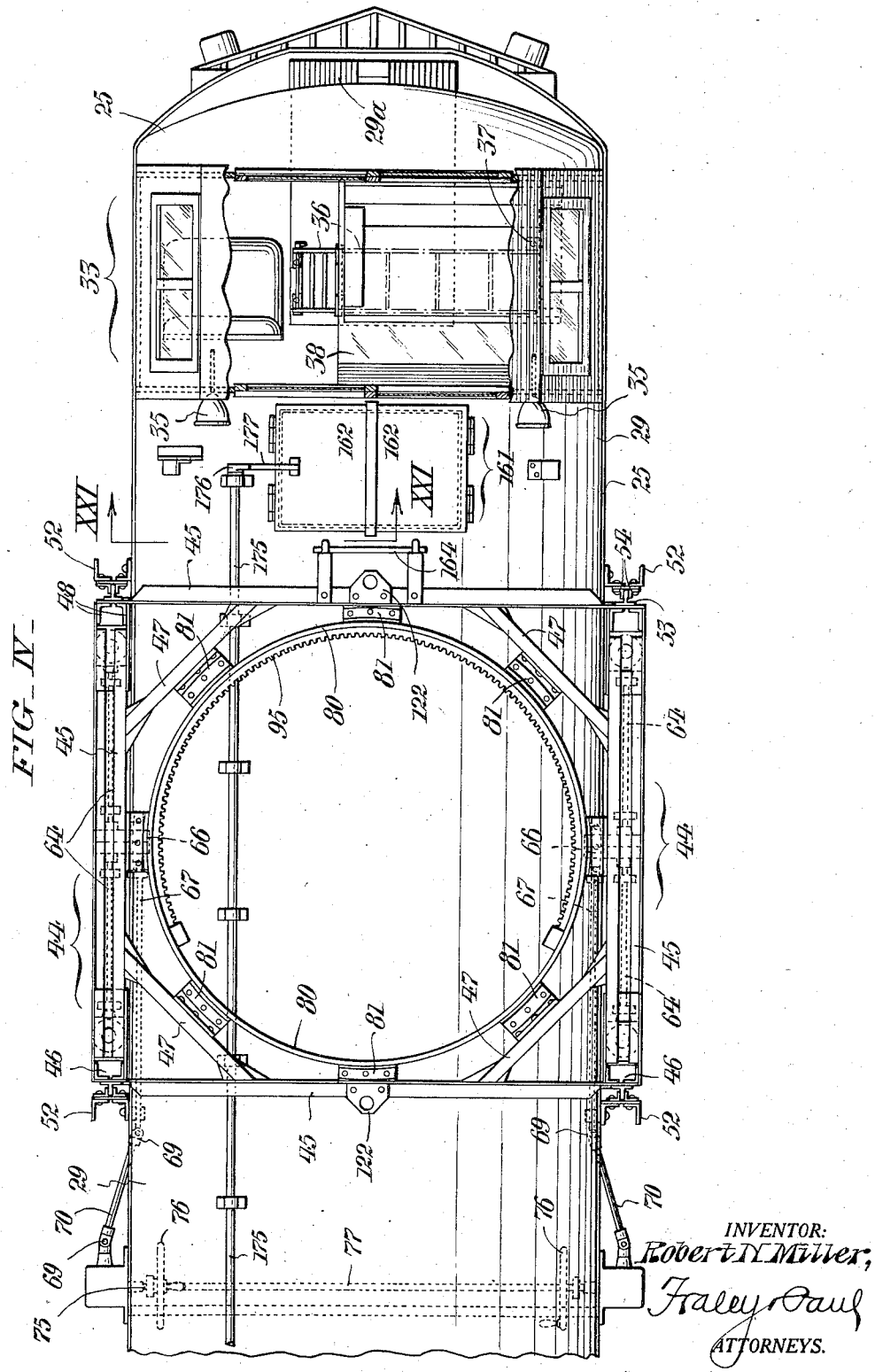

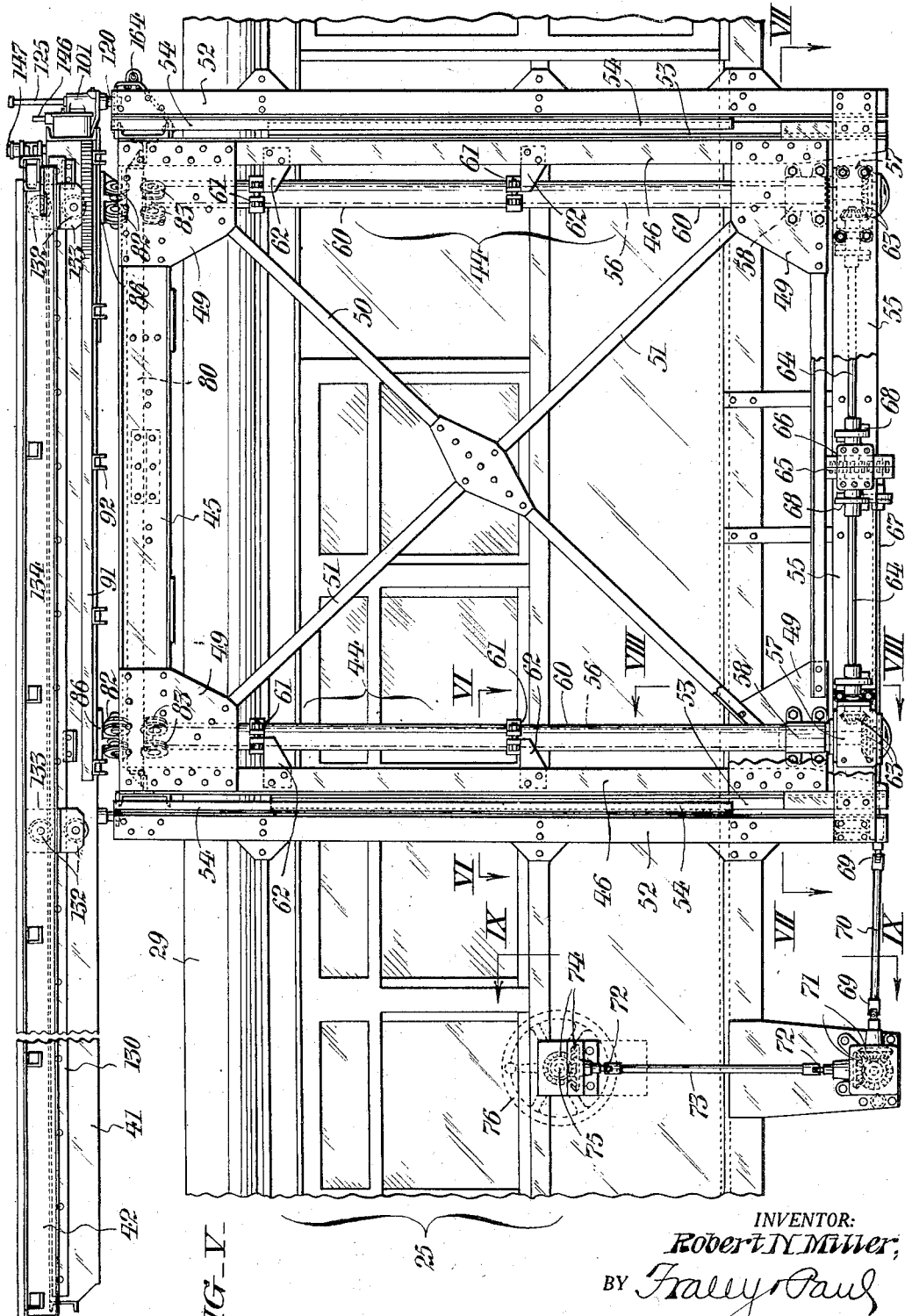

Feb. 11, 1936.  R. N. MILLER  2,030,650
TROLLEY PATROL CAR
Filed Nov. 6, 1931  12 Sheets-Sheet 5
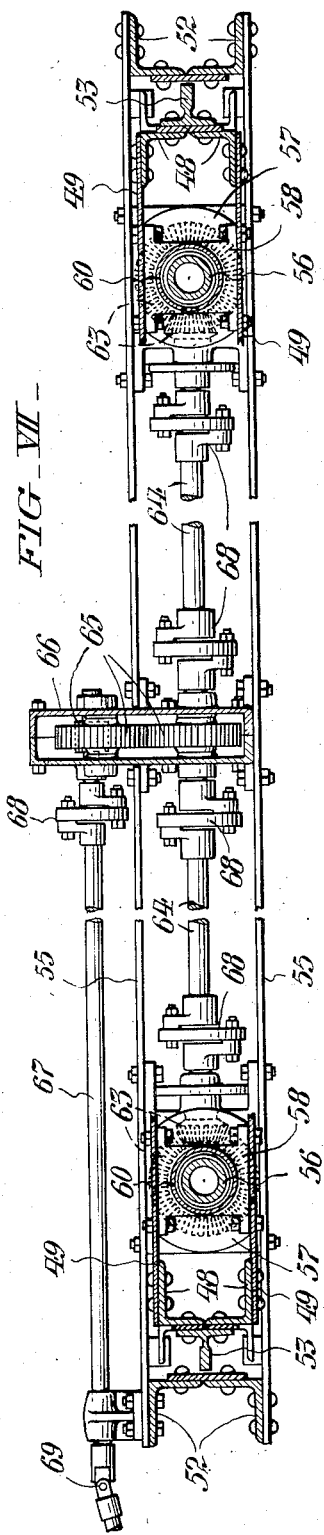
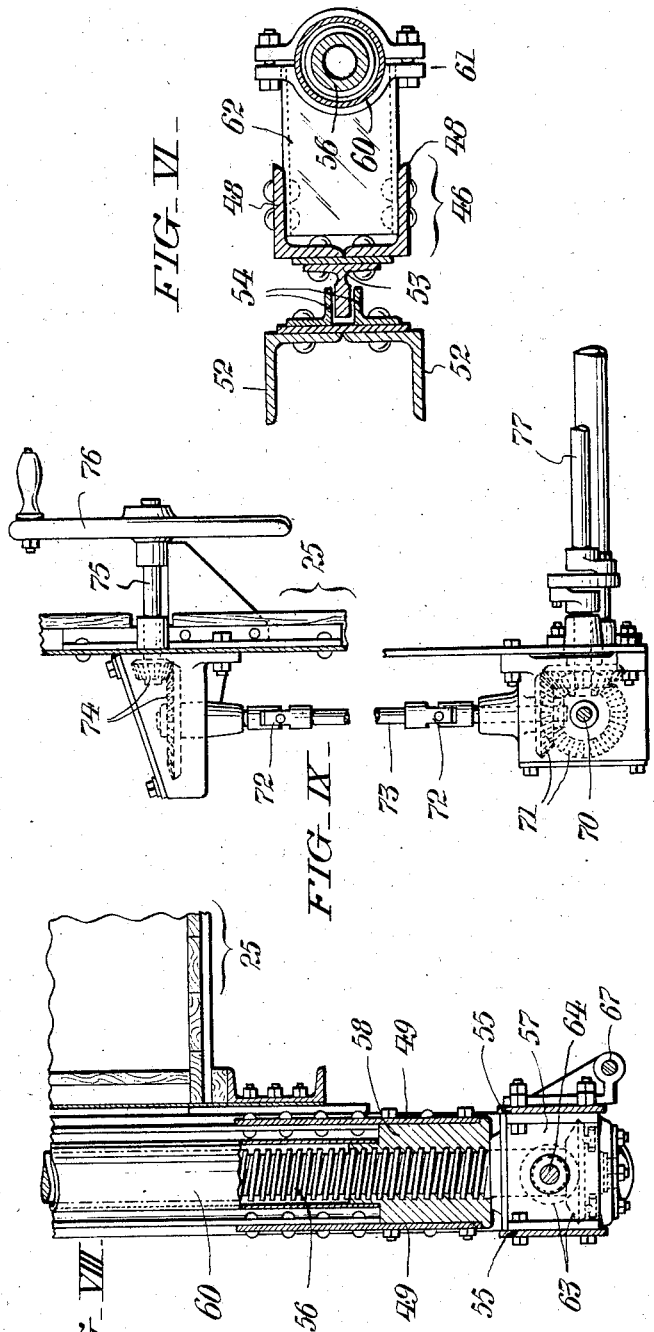
INVENTOR:
Robert N Miller;
BY
ATTORNEYS.

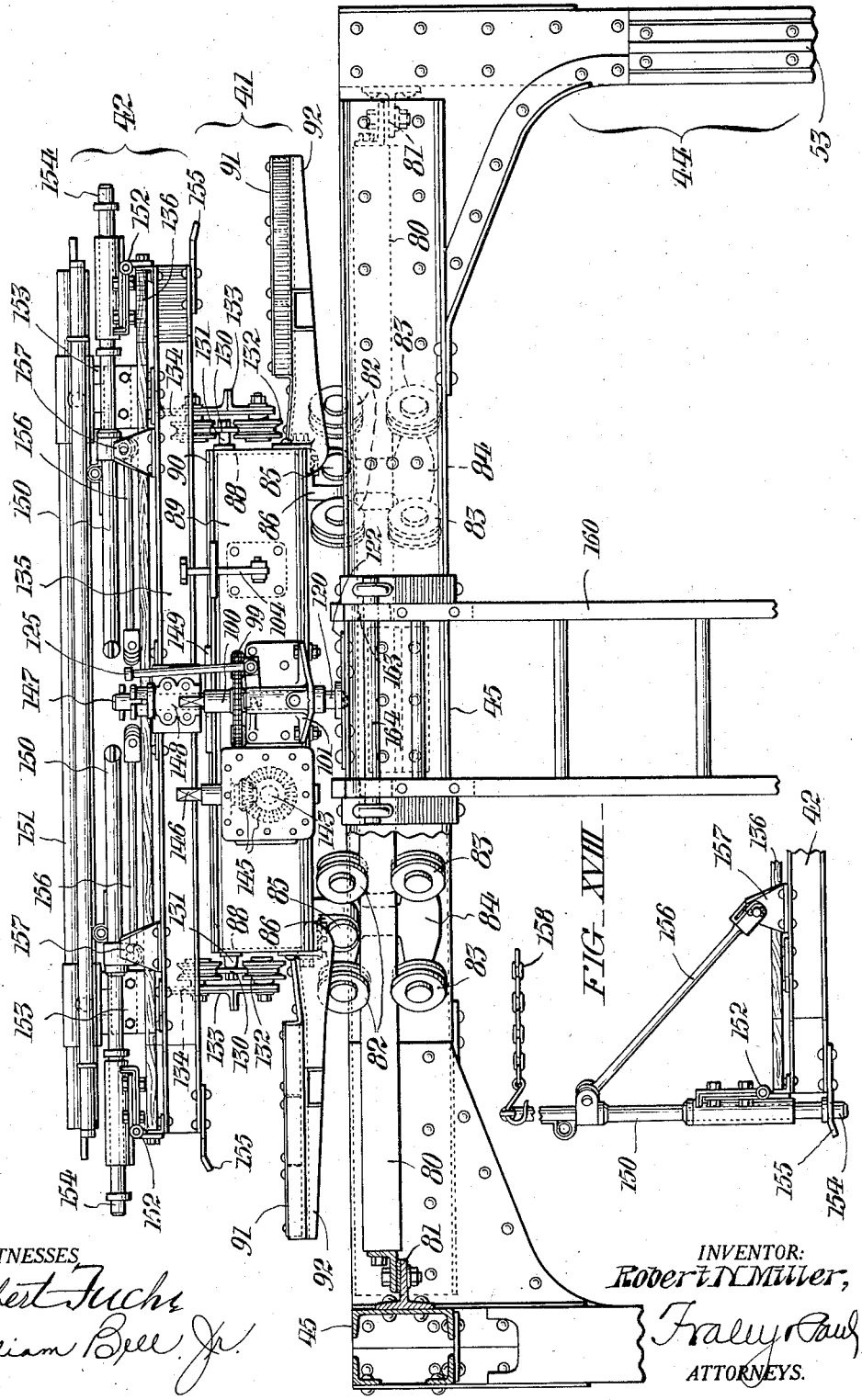

Feb. 11, 1936.  R. N. MILLER  2,030,650
TROLLEY PATROL CAR
Filed Nov. 6, 1931   12 Sheets-Sheet 7
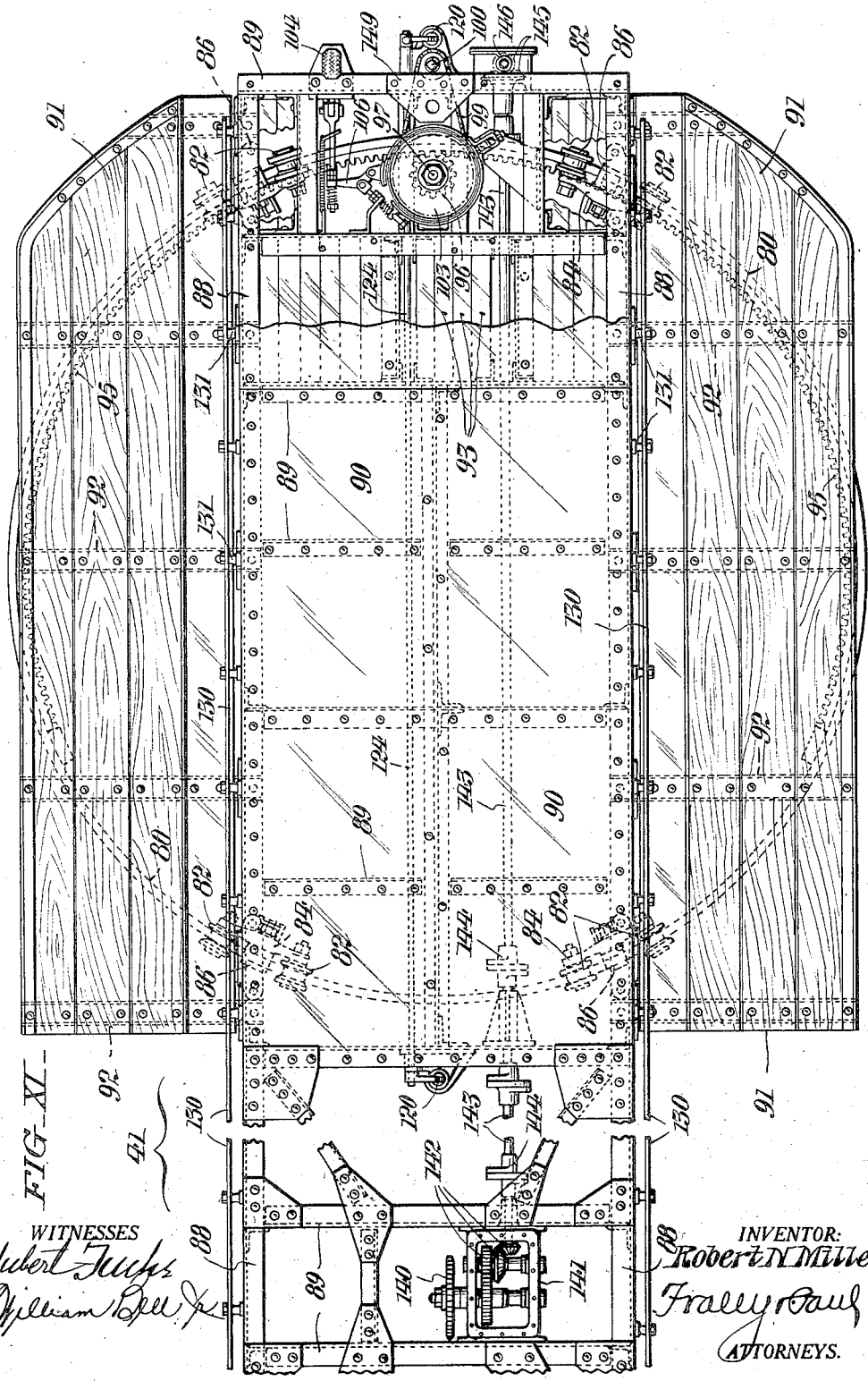
FIG. XI
WITNESSES
INVENTOR:
Robert N. Miller,
ATTORNEYS.

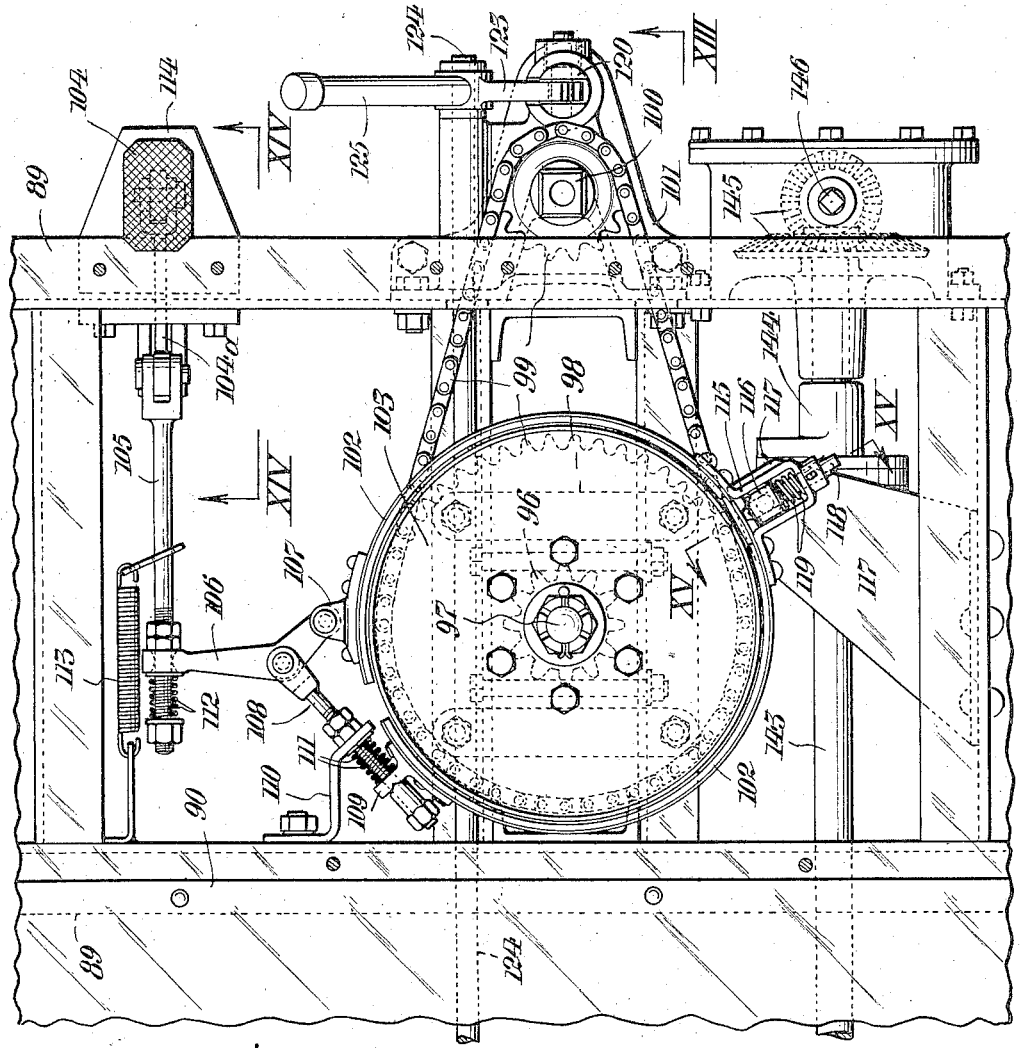

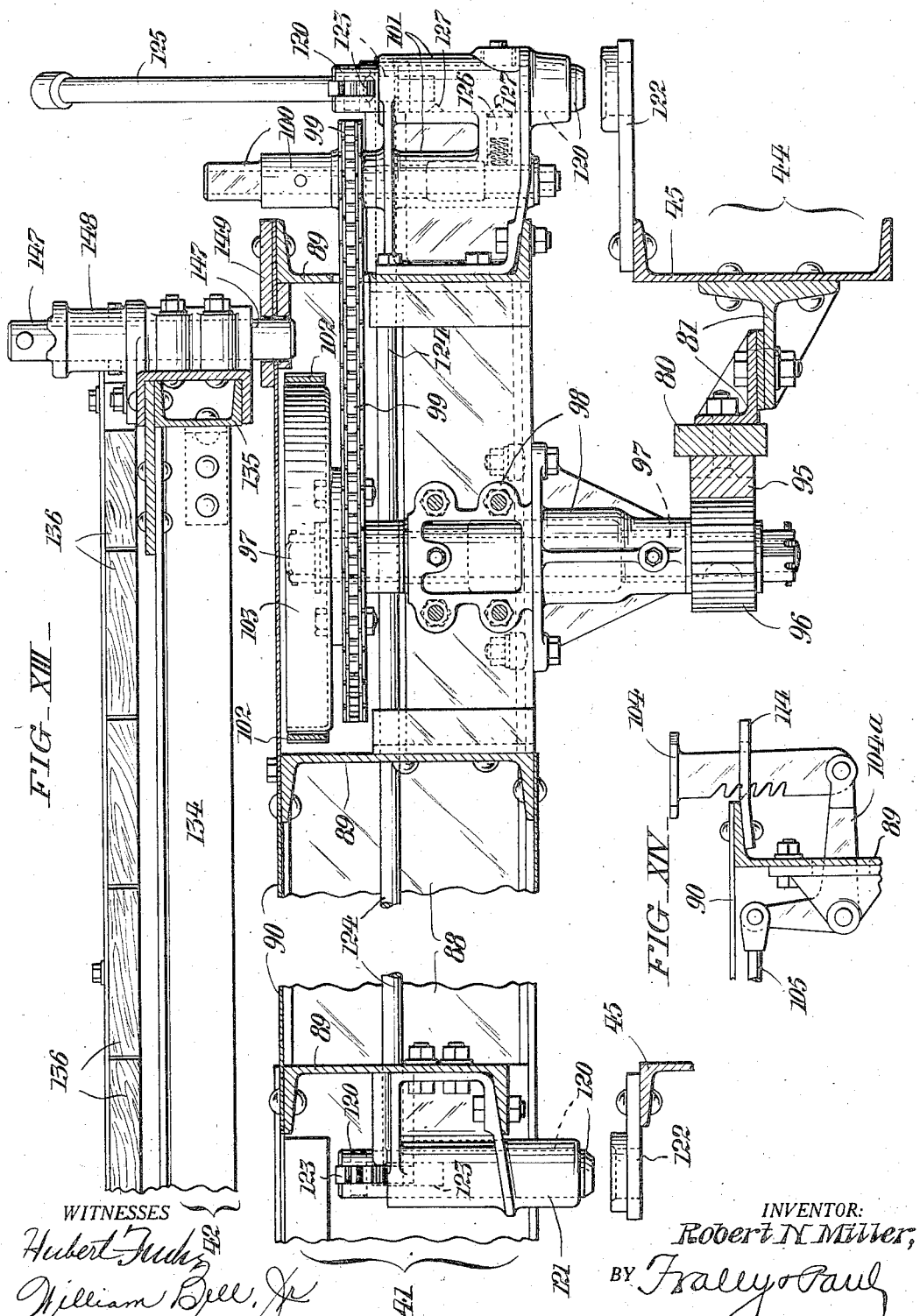

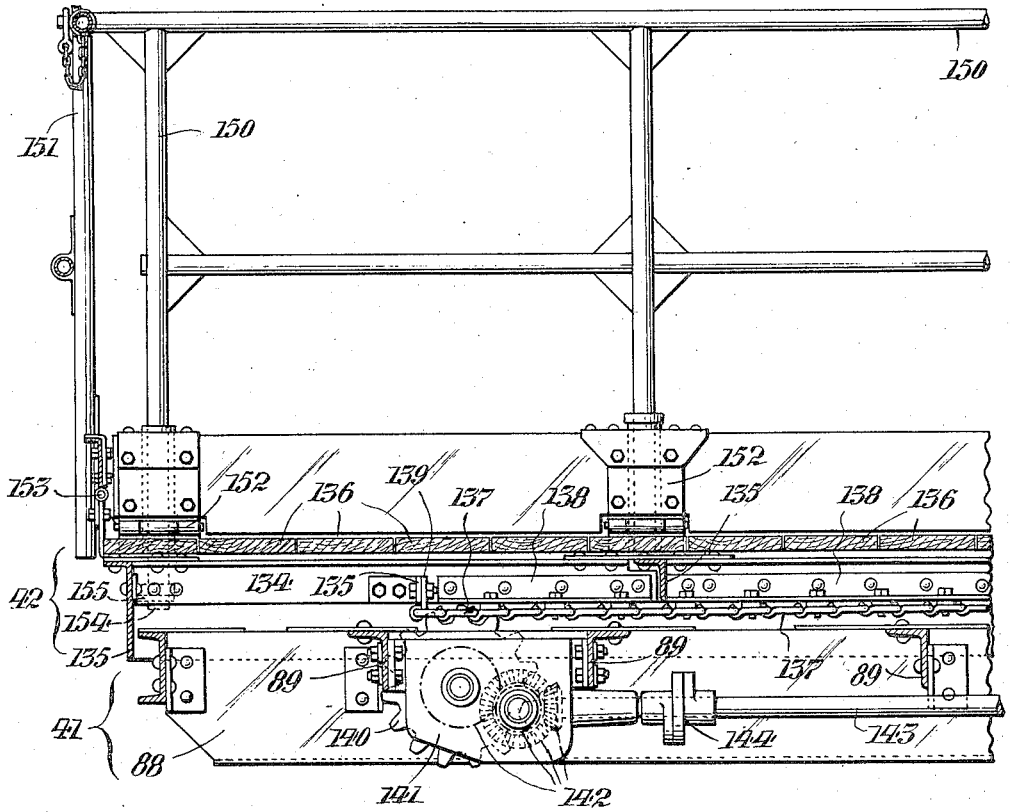
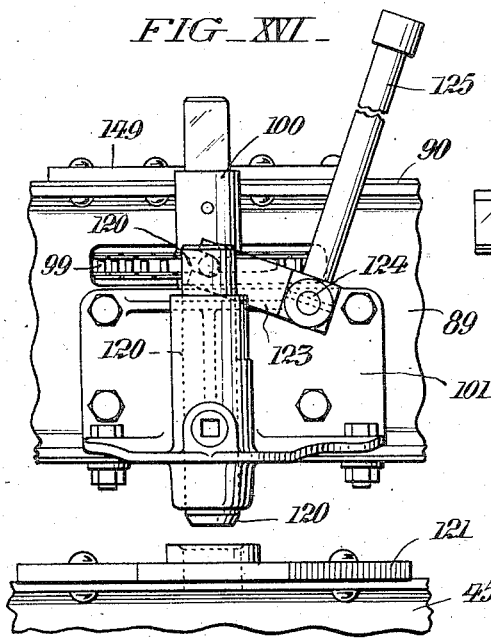
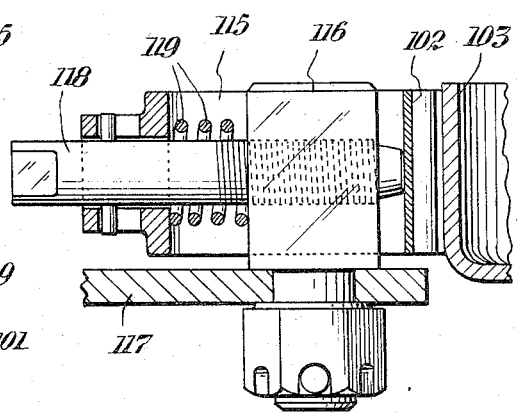

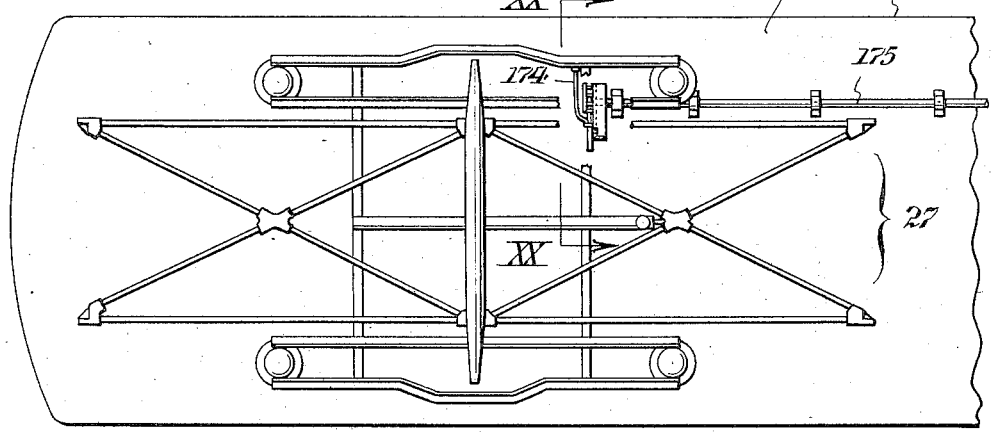
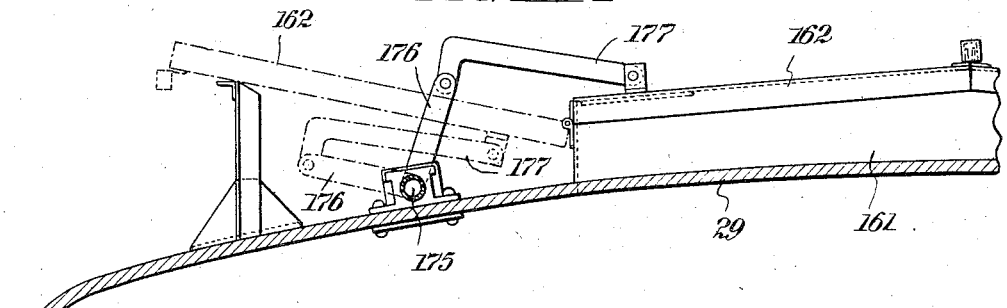
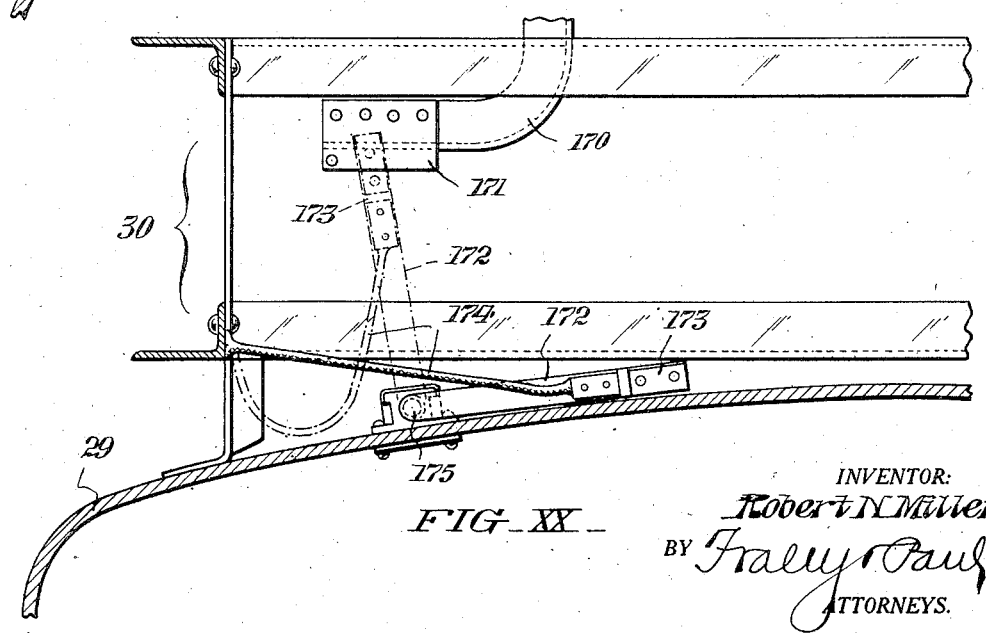

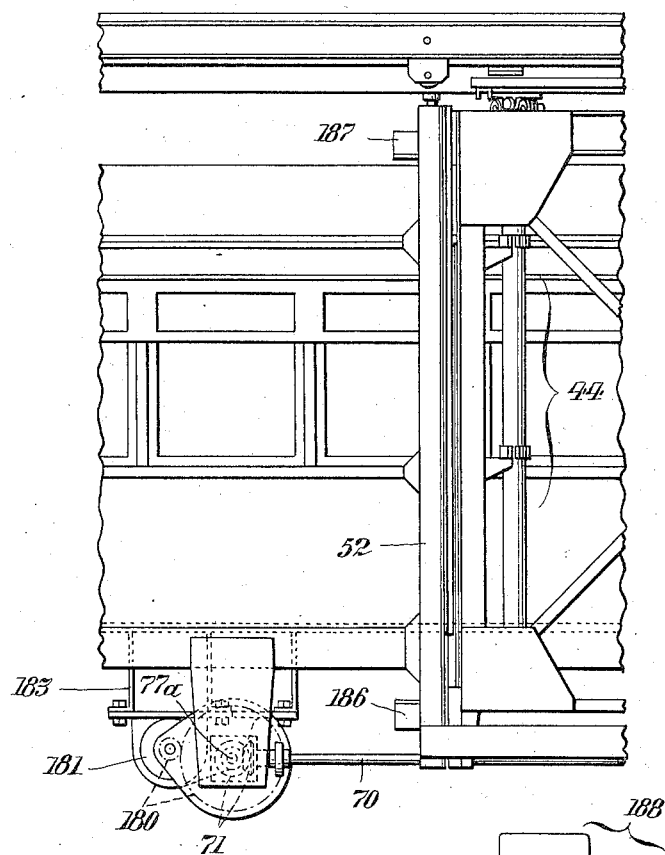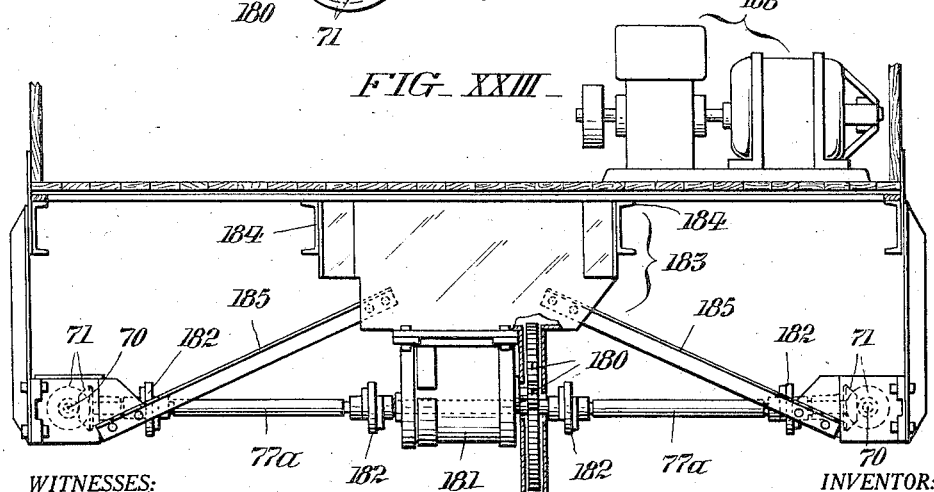

Patented Feb. 11, 1936

2,030,650

UNITED STATES PATENT OFFICE 2,030,650

TROLLEY PATROL CAR

Robert N. Miller, Altoona, Pa.

Application November 6, 1931, Serial No. 573,357

7 Claims. (Cl. 105—238)

The invention relates to a trolley patrol car, useful for maintenance purposes in connection with overhead trolley systems, and especially adaptable to trolley inspection and repair on electrified steam railroads. The invention affords a means of doing such work quickly, efficiently, and with maximum safety to the workmen. How these and other advantages can be realized will appear from the description hereinafter of one preferred form of embodiment.

In the drawings, Fig. I is a side view of a car conveniently embodying the invention, with its trolley raised, and its work platform stowed for travel.

Fig. II is a front view of the car, with trolley lowered and tower omitted.

Fig. III is an end-on view with the car in cross-section as indicated by the line and arrows III—III in Fig. I, the work platform being shown stowed in full lines and fully raised and extended in dot and dash lines.

Fig. IV is a plan view of the front portion of the car, with the work platform and certain associated parts removed, and with the roof of the observation cabin or shelter partly broken away.

Fig. V is a fragmentary side view, on a larger scale than Fig. I, illustrating especially the tower and associated parts, a portion of one member being broken away.

Fig. VI is a fragmentary horizontal section, taken as indicated by the line and arrows VI—VI in Fig. V, showing how the vertical movement of the tower is guided.

Fig. VII shows a horizontal section through part of the tower raising and lowering mechanism, taken as indicated by the line and arrows VII—VII in Fig. V.

Fig. VIII is a fragmentary cross-section, taken as indicated by the line and arrows VIII—VIII in Fig. V.

Fig. IX is a similar view illustrating the tower-operating connections from inside the car, the section being taken as indicated by the line and arrows IX—IX in Fig. V.

Fig. X is a fragmentary end-on view of the tower from the front of the car, with the platform stowed for travel as in Figs. I and V, and with certain portions broken away.

Fig. XI is a plan view of the main working platform, with portions broken away.

Fig. XII is a plan view of part of the platform operating and controlling mechanism, on a larger scale than Fig. XI.

Fig. XIII is a fragmentary vertical sectional view, taken as indicated by the line and arrows XIII—XIII in Fig. XII.

Fig. XIV is a fragmentary vertical sectional view illustrating the brake operating device, taken as indicated by the line and arrows XIV—XIV in Fig. XII.

Fig. XV is a fragmentary vertical sectional view, illustrating the mounting of the brake band for controlling the operation of the main platform.

Fig. XVI is a fragmentary side view, illustrating the locking mechanism for the main platform.

Fig. XVII is a vertical longitudinal sectional view, illustrating the extension platform and its operating mechanism.

Fig. XVIII is a fragmentary end view of the extension platform and its railing.

Fig. XIX is a somewhat diagrammatic plan view of the pantograph trolley and associated parts, illustrating the provisions for grounding it.

Fig. XX is a fragmentary transverse sectional view of the car roof, the trolley sub-base, and the trolley grounding arrangements.

Fig. XXI is a similar view of the car roof, the hatch for access thereto, and connections to the hatch cover for automatically operating the grounding mechanism.

Fig. XXII is a fragmentary side view similar to Fig. I, but showing provisions for raising and lowering the work platform by electric power.

Fig. XXIII is a fragmentary view with various parts of the car in transverse vertical section, also illustrating the provisions for raising and lowering the work platform by electric power.

In Figs. I, II, III, IV and V, the invention is shown as adapted to a car of passenger type, comprising an ordinary body 25 and running gear 26, and equipped with a trolley 27 which may serve for propulsion or to facilitate inspection of the overhead trolley system 28, or both. Other means of self-propulsion for the car may be provided, such as a gasoline-mechanical or gasoline electric drive,—indicated by the air-cooled radiator 29$a$ at the front of the car (Figs. I, II, and IV). This renders the car independent of the trolley system 28 on occasion.

The trolley 27 is shown as a pantograph mounted at one end of the car roof 29 (here the rear) on a suitable insulating sub-base 30; it may be spring-raised and air-lowered, as usual. During inspection, the trolley 27 will usually be carried against the overhead trolley wire 28, for the purpose of determining its alignment and elevation relative to the tracks: i. e., the trolley serves as a gauge for this purpose. Provision is preferably made, however, for grounding the trolley 27 when engaged against the wire 28, for the protection of workmen when it is necessary to work on the wire, as described hereinafter.

At the other end of the car (here the front) is shown an observation cupola, cabin, or shelter 33 extending above the roof 29, whence an observer may examine the condition of the overhead trolley wire 28 and its supporting means (not shown) as the car passes along the line. Manually operated spot lights 35, 35 near the corners of the cupola 33 afford illumination for inspection at night. The cupola 33 can be reached from the interior of the car by a folding ladder 36, that can be swung up and fastened against the hatch 37 in the cupola floor 38 when not in use.

The car also has a working section 40 including a platform structure 41 whence work can conveniently be done on the overhead trolley system 28, including portions thereof over the adjacent tracks to either side, as well as over the track on which the car happens to be running. The section 40 is contractible and expansible, so that the platform structure 41 can be compactly stowed on the car roof 29 between trolley 27 and cupola 33, or extended laterally and upward therefrom (Fig. III). For the purpose of lateral extension and contraction, the platform structure 41 is mounted to swing horizontally and provided with a horizontally movable extension 42 that can be projected to the side when the platform structure 41 has been swung from its fore and aft travelling position (Figs. I, III, and V) to its transverse working position (Fig. III). To enable the platform structure 41 to be raised and lowered, it is mounted on a tower structure 44 that can be extended upward and retracted downward, substantially level with the top of the cabin 33 and the trolley 27, as required.

As shown in Figs. I, III, and V, the tower structure 44 is of inverted U-form (when seen from the front or rear of the car), consisting of a transverse horizontal portion or framework 45 extending across and over the car roof 29, and interconnecting the upper ends of upright side legs 46, which are arranged in proximity to the car sides. Preferably, the legs 46 are outside the car sides, so that the tower 44 as a whole straddles the car body 25. The horizontal portion 45 consists of a rectangular framework with 45° corner braces 47, while the side legs 46 comprise uprights 48, of double angle sections, secured and braced by corner gussets 49 and diagonal and horizontal ties 50 and 51. The tower structure 44 is guided in its up and down movement by upright guide members 52, of channel section, mounted on the car sides fore and aft of the leg uprights 48, and here shown as extending above and below the car body 25. As shown in Fig. VI, each leg upright 48 carries a T-bar 53 whose guide web slides between the guide flanges of angle bars 54 secured to the corresponding guide member 52. As shown in Figs. I, V, and VII, the lower ends of the channelled guide members 52, 52 at each side of the car are interconnected by a horizontal member 55, consisting of parallel plates fastened to the channel flanges.

The tower structure 44 is raised and lowered, preferably, by the leg uprights 48. For this purpose, there are upright screw shafts 56 mounted in bearings 57 secured in the horizontal member 55, and thus carried by the guide members 52, 52 (Figs. V, VII, and VIII). These screw shafts 56 are located adjacent the tower leg uprights 48, and are in threaded engagement in nut blocks 58 secured to the gusset plates 49 at the lower ends of the tower legs. When the tower 44 is lowered, the screws 56 are housed in tubular casings 60, fitting over reduced projections on the blocks 58, and supported by yokes 61 clamped on the casings 60 and resting on arms 62 projecting from the flanges of the channelled uprights 48. By turning the four screw shafts 56 concurrently one way or the other, the tower legs 46, 46 and the whole tower structure 44 are raised and lowered.

The oppositely threaded screw shafts 56, 56 at each side of the car are connected by bevel gearing 63 to opposite ends of a horizontal shaft 64 which is in turn connected, by spur gearing 65 enclosed in a housing 66 and operating through an opening in the member 55, to a horizontal shaft 67 mounted in bearings at the inner side of the member 55. Flexible disc joints 68 are interposed in the shafts 64 and 67 to take care of any slight misalignment. The shaft 67 is connected, through universal joints 69 and a horizontal floating shaft section 70, to a bevel gear train 71 which is in turn connected, through universal joints 72 and a vertical floating shaft 73, to a bevel gear train 74 whose horizontal shaft 75 extends in through the car side and carries a handwheel 76 (Figs. I, III, V, and IX). The bevel gear trains 71, 71 at opposite sides of the car are preferably interconnected by a horizontal shaft 77, to insure concurrent raising of the side legs 46, 46 and prevent "cocking" of the tower structure on the car. By concurrent operation of the two handwheels 76, 76 inside the car, the tower structure 44 is easily raised and lowered.

Referring, now, to Figs. IV, V, X, and XI it will be seen that a circular track 80, of flat section, is mounted and secured in the horizontal tower framework 45, on brackets 81, and that the platform structure 41 has grooved rollers 82 that rest on the track 80 at diametrically opposite points. These rollers 82 are in pairs, and there are coacting pairs of grooved rollers 83 underrunning the track 80 directly opposite the rollers 82. Corresponding sets of rollers 82, 82 and 83, 83 are mounted on I brackets 84, pivoted at 85 on brackets 86. Thus the structure 41 is movably (rotatably) mounted and secured on the tower 44. As shown in Figs. X and XI, the platform structure 41 has horizontal channel sills 88 with interconnecting cross members 89, and a deck of metal plating 90 secured to said members 88, 89. The bracket 86 that carries the rollers 82, 83 is mounted on the sills 88. The deck 90 is supplemented at either side with a plank walk 91 carried by cantilever bracket arms 92 attached to the sills 88. As shown in Figs. I, V, and XI, one end of the platform structure 41 projects beyond the track 80 considerably more than the other, and is counterbalanced by ballast bars 93 mounted between the cross members 89 at the short end.

As shown in Figs. IV, V, X, XI, XII, and XIII, the platform structure 41 can be operated by means of an arcuate rack 95 at the inner side of the track 80, and a coacting pinion 96 on the lower end of an upright shaft 97 mounted in a bearing bracket structure 98 on the platform frame. The shaft 97 is connected by a sprocket chain drive 99 to an upright shaft 100 mounted in a bracket 101 at the short end of the platform 41. The shaft 100 is squared at its upper end to take a suitable operating crank or wheel (not shown).

For controlling the movement of the platform structure 41, and preventing it from swinging too far under its momentum, a friction brake may be provided, consisting of a band 102 around a drum or wheel 103 fast on the shaft 97, above the sprocket drive 99. The brake band 102 may be tightened on the drum 103 by depressing a foot pedal 104 pivoted to a bell-crank 104a fulcrumed on the end of the platform 41 and connected by a rod 105 to one end of a lever 106 which is pivoted to a bracket 107 on one end of the band 102 and to a rod 108 connected to a bracket 109 on the other end of the band 102.

The rod 108 extends through a supporting bracket 110 on the platform 41, and a compression spring 111 around the rod acts between brackets 110 and 109 to expand the brake band 102 when pressure on the pedal 104 is released. There is also a compression spring 112 interposed between rod 105 and lever 106, and a tension spring 113 acting on the rod 105 to raise the pedal 104. The upright shank of the pedal 104 extends through a slot in a bracket 114 on the end of the platform 41, and is toothed to engage the end of the slot (see Fig. XIV) to hold the brake band 102 tight. The brake band 102 is supported partly by the bracket 110 (Figs. XI and XII) and partly by a yoke bracket 115 on the band, in which is slidably engaged a block 116 pivoted to a bracket 117 on the platform 41 (Fig. XV). A pin 118 mounted loosely in the yoke bracket 115 is threaded through the block 116, and there is a compression spring 119 on this pin between the block and the end of the yoke.

Provision is preferably made for positively locking the platform 41 as desired, particularly in the longitudinal or fore and aft position of Figs. I, V, X, XI, and XII. For this purpose, vertical locking pins or bolts 120 may be slidably mounted in the bracket 101 and in a diametrically opposite bracket 121 on a cross member 89 (Figs. XII, XIII, and XVI) to engage corresponding socket holes in locking brackets 122 on the horizontal tower framework 45. The bolts 120, 120 have pin and slot connections to cranks 123, 123 on a shaft 124 mounted in suitable bearings below the deck plating 90. The pins 120, 120 may be operated by a hand lever 125 on the shaft 124. As shown in Fig. XIII, there is a yielding conical-pointed spring actuated catch 126 in the bracket 101, and the corresponding pin 120 has conical sockets 127, 127 to receive the catch, which thus holds the pin in either platform-locking position or disengaged position.

As shown in Figs. V, X, and XI, there are track bars 130, 130 along opposite sides or edges of the main platform 41, mounted on brackets 131 on the sills 88, 88. The platform extension 42 has pairs of coacting opposed grooved rollers 132, 132, mounted in brackets 133 and engaging the upper and lower edges of the tracks 130,—very much as in the case of the track 80 and the rollers 82, 83. Thus the platform extension 42 is movably mounted and secured on the platform structure 41. As shown in Figs. V, X, XIII, and XVII, the platform extension 42 has horizontal sills 134 with interconnecting cross members 135, and is decked with planking 136. The roller brackets 133 are secured to the sills 134, with the rollers 132 at the inner sides of the latter.

The platform extension 42 can be operated to project it as shown in Fig. III, or retract it to the position shown in Figs. I, V, and XVII, by means of a sprocket chain rack 137 stretched therebeneath against angle bars 138 secured to the cross members 135. The chain 137 may be secured at its ends to clips 139 on the members 135. This rack-chain 137 engages a pinion or sprocket wheel 140 whose shaft has bearings in a casing structure 141 mounted between cross members 89 of the platform 41. The sprocket wheel 140 is connected through a train of spur and bevel gearing 142 in the casing 141 to a longitudinal shaft 143 mounted in suitable bearings beneath the deck 90, and including flexible disc couplings 144 to take care of minor misalignment. The shaft 143 extends to the short end of the platform 41, where it is connected by bevel gearing 145 to an upright shaft 146 whose upper end is squared to take an operating crank or wheel (not shown). Thus the extension 42 can be operated and controlled from the same point as the platform 41, as above explained.

Provision may be made for positively locking the extension platform 42 as desired, and particularly in its inner, retracted position of Figs. I and IV, by means of a vertical locking pin 147 slidably mounted in a bracket 148 on the inner end of platform 42, and adapted to engage a socket hole in a locking bracket 149 on the inner cross member 89 of the platform 41.

As shown in Figs. III, X, and XVII, the sides and outer end of the extension platform 42 are provided with a collapsible railing, consisting of inward-folding side and end sections 150, 151 whose uprights are hinged to the platform at 152, 153. When folded, the railings 150 lie flat on the platform 42, and the railing 151 overlies them as in Fig. X. The lower ends of the side rail upright have yielding spring bolts 154 which engage socket openings in bevel-ended clips 155 on the platform 42 when the railings 150 are raised, and thus the side railings 150 are locked upright. Under these conditions, the ends of the railings 150 engage the inner side of the end rail 151 and hold it upright. At the inner end of the platform 42, hinged struts 156 are provided for the side rails 150. The lower ends of the struts 156 can be detachably secured to ears 157 on the platform 42 when the side rails 150 are raised, as shown in Fig. XVIII, and a chain 158 can be detachably stretched across between the side rails at this end of the platform.

Access may be had to the working section 40 and its platforms 41, 42, even when the tower 44 is raised, by a ladder 160 adapted to extend up from the interior of the car through a hatch 161 in its roof just outside the cupola 33. For closing the hatch 161 there is a cover whose halves 162 are hinged to opposite sides of the hatch combing, and meet in the middle. When the hatch 161 is open, the tower 44 lowered, and the ladder 160 raised (as in Fig. I), hooks 163 on the upper end of the ladder lie over a bar 164 mounted on the tower frame 45, so as to be caught as the tower 44 is raised, and pull the ladder up with it.

Provisions for grounding the trolley 27, as above mentioned, are shown in Figs. IV, XIX, XX, and XXI. They include an arm 170 on the trolley frame provided with a contact 171, and a swinging arm 172 provided with a contact 173 connected by a flexible conductor 174 to a grounded portion of the trolley sub-base 30. When the arm 172 is swung up from the full line position in Fig. XX to the dot and dash position, its contact 173 engages the contact 171 and grounds the trolley structure. As here shown, the arm 172 is attached to a longitudinal shaft 175 that extends along the car roof in suitable bearings to a point adjacent the hatch 161, so that the grounding may be accomplished from this point before entering upon the working section 40. As shown in Fig. XXI, this end of the shaft 175 has a crank arm 176 that is connected by a link 177 to one of the hatch covers or closures 162. Thus the grounding is effected automatically whenever the closure 162 is opened.

As shown in Figs. XXII and XXIII the transverse shaft 77a interconnecting the tower-raising and lowering means at the two sides of the car is itself connected by spur gearing 180 to a reversible electric motor 181 mounted beneath the car, so that the tower 44 may be raised and lowered electrically. Accordingly, the parts 73, 74, 75, 76 for hand operation of the tower-raising and lowering means are preferably omitted. As shown in Fig. XXIII, flexible disc universal joints 182 are interposed in the shaft 77a adjacent the bevel gearings 71 and the spur gearing 180, to take care of any minor misalignment. The motor 181 and the gearing 180 are shown mounted on a structure 183 on the longitudinal center sill 184 of the car body, and the casings of the bevel gearings 71 are braced to this structure 183 by diagonal ties 185. Automatic limit switches 186, 187 are shown on the guideways 52, to prevent upward or downward overtravel of the tower 44. In order that the raising and lowering of the tower 44 may be independent of power from the trolley wire 28, a gasoline electric power plant 188 may be provided to supply the motor 181.

Having thus described my invention, I claim:

1. A car of the character described comprising, in combination with a car body and running gear, an overhead trolley extensible upward from the car roof, an observation cabin extending upward from the car roof, a tower structure extensible upward and laterally from the car roof between said cabin and trolley, a working platform carried by said tower structure, and a railing on said platform, said tower structure and railing being collapsible to a position not obstructing the view of the trolley wire at said trolley from the cabin.

2. A car of the character described comprising, in combination with a car body and running gear, an observation cabin extending upward from the car roof, and affording the occupant a view of the trolley wire over the car body; an overhead trolley extensible upward from the car roof; and a platform swingable horizontally from a longitudinal position over the car roof where it is stowed between said trolley and cabin to a transverse position and vice-versa, and also extensible and contractible, so that it may be projected laterally from the car roof when swung to transverse position, and may be retracted to lie stowed between trolley and cabin when swung to longitudinal position; said trolley wire and the trolley engaged therewith being visible over the platform when the latter is stowed as aforesaid.

3. A car of the character described comprising, in combination with a car body and running gear, an observation cabin extending upward from the car roof and affording the occupant a view of the trolley wire over the car body; an overhead trolley extensible upward from the car roof to an elevation greater than that of said cabin; a platform swingable horizontally from a longitudinal position over the car roof between said trolley and cabin to a transverse position, and vice versa, and also extensible and contractible, so that it may be projected laterally from the car roof when swung to transverse position, and may be retracted to lie between trolley and cabin when swung to longitudinal position; and a tower carrying said platform extensible to raise the same to an elevation greater than that of the cabin and retractible to lower it substantially level with the top of the cabin, so as to leave unobstructed the view from the cabin of the trolley wire and the trolley when engaged therewith.

4. A car of the character described comprising, in combination with a car body and running gear, an overhead trolley extensible and retractible upward and downward from and toward the car roof; an observation cabin extending above the car roof, and affording the occupant a view of the trolley wire and of the trolley when the latter is extended and engaged with said wire, so that the trolley may serve as a gauge of the height and alignment of the trolley wire relative to the track; and a tower structure between said cabin and trolley extensible upward from the car roof to permit working therefrom on the trolley wire, and retractible downward out of the way so as to leave unobstructed the view of the trolley wire and trolley from the cabin.

5. A car of the character described comprising, in combination with a car body and running gear, an overhead trolley extensible and retractible upward and downward from and toward the car roof at one end thereof; an observation cabin extending above the car roof at the other end thereof, and affording the occupant a view of the trolley wire and of the trolley when the latter is extended and engaged with said wire, so that the trolley may serve as a gauge of the height and alignment of the trolley wire relative to the track; and a tower structure between said cabin and trolley extensible upward from the car roof to permit working therefrom on the trolley wire, and retractible downward out of the way so as to leave unobstructed the view of the trolley wire and trolley from the cabin.

6. A car of the character described comprising, in combination with a car body and running gear, an observation cabin extending above the car roof, and affording the occupant a view of the trolley wire over the car body; an overhead trolley extensible upward from the car roof to an elevation greater than that of said cabin and retractible downward substantially level with the top of the cabin; and a platform swingable horizontally from a longitudinal position over the car roof where it is stowed between said cabin and trolley to a transverse position, and vice-versa, and also extensible to a greater length than the distance between said cabin and trolley when in transverse position, and retractible to a less length so as to permit of its being swung into longitudinal position and stowed between said cabin and trolley as aforesaid; said trolley wire and the trolley engaged therewith being visible over the platform when the latter is stowed as aforesaid.

7. A car of the character described comprising, in combination with a car body and running gear, an observation cabin extending above the car roof, and affording the occupant a view of the trolley wire over the car body; an overhead trolley extensible upward from the car roof to an elevation greater than that of said cabin and retractible downward substantially level with the top of the cabin; a platform swingable horizontally from a longitudinal position over the car roof between said cabin and trolley to a transverse position, and vice-versa, and also extensible to a greater length than the distance between said cabin and trolley when in transverse position, and retractible to a less length so as to permit of its being swung into longitudinal position between said cabin and trolley as aforesaid; and a tower carrying said platform extensible upward to raise the platform to an elevation greater than that of the cabin so as to permit working from the platform on the trolley wire, and retractible downward to lower the platform substantially level with the top of the cabin, so as to leave unobstructed the view from the cabin of the trolley wire and the trolley when engaged therewith.

ROBERT N. MILLER.